United States Patent

[11] 3,599,162

[72] Inventors Paul D. Byrns; Duane H. Anderson, St. Paul; Peter A. Meyer, Roseville, all of, Minn.

[21] Appl. No. 818,324

[22] Filed Apr. 22, 1969

[45] Patented Aug. 10, 1971

[73] Assignee Comcet Incorporated St. Paul, Minn.

[54] PRIORITY TABLING AND PROCESSING OF INTERRUPTS

3 Claims, 3 Drawing Figs.

[52] U.S. Cl. .......... 340/172.5

[51] Int. Cl. .......... G06f 9/18

[50] Field of Search .......... 340/172.5; 235/157

[56] References Cited

UNITED STATES PATENTS

| | | | |
|---|---|---|---|
| 3,283,306 | 11/1966 | Patrusky .......... | 340/172.5 |
| 3,331,055 | 7/1967 | Betz et al. .......... | 340/172.5 |
| 3,333,252 | 7/1967 | Shimabukuro .......... | 340/172.5 |
| 3,399,384 | 8/1968 | Crockett et al. .......... | 340/172.5 |
| 3,456,244 | 7/1969 | Seichter et al. .......... | 340/172.5 |
| 3,473,154 | 10/1969 | Couleur et al. .......... | 340/172.5 |
| 3,473,155 | 10/1969 | Couleur et al. .......... | 340/172.5 |

*Primary Examiner*—Paul J. Henon
*Assistant Examiner*—Harvey E. Springborn
*Attorney*—Alfred E. Hall

ABSTRACT: A circuit for tabling and processing interrupts on a priority basis including a separate table for each level of interrupt priority.

INVENTORS
PAUL D. BYRNS
DUANE H. ANDERSON
PETER A. MEYER

BY Alfred E. Hall
ATTORNEY

INVENTORS
PAUL D. BYRNS
DUANE H. ANDERSON
PETER A. MEYER

BY Alfred E. Hall
ATTORNEY

PRIORITY TABLING AND PROCESSING OF INTERRUPTS

BACKGROUND OF THE INVENTION

The present invention relates to priority tabling and and processing of interrupts and, in particular, to a circuit for tabling interrupts on a priority basis with a separate table for each level of interrupt priority.

In early computer systems, tasks were performed in successive order with the computer periodically checking the task being performed to detect any changes such as completion of the task.

Modern computers perform many tasks simultaneously and utilize executive routines to cause the tasks to be properly and orderly completed. When the system is proceeding to accomplish a task through a series of instructions, certain events both within and external to the system may occur which require altering the sequence of operation of the system. The executive routine must be kept informed of the changes in events taking place. Signals representing these changes have become known in the art as "interruptions." The changes themselves are in the form of data associated with an "interrupt." Therefore, throughout this specification, the term "interrupt" as used is intended to represent the data associated with it except where the interrupt signals themselves are processed apart from the data. Many different kinds of interruptions are known in the art and include interruptions caused by operator control, external devices with different priorities, and internal operations such as End-of-Transmission, Buffer Expiration, overflow, etc.

It is obvious that among the many interrupts, some should be accepted before others and, thus, should have a higher priority in order that they can be processed first.

Further, in real time communication systems of today, a computer may be utilized to perform operations on digital data supplied to it by external devices at a plurality of different locations. These external devices may include devices operating at comparatively slow speeds as well as devices operating at relatively high speeds. Low speeds devices are those requiring mechanical operations such as paper tapes, magnetic tapes, keyboards, printers, etc. While high speed devices include other computing devices such as in multicomputer complex.

If it is necessary that one of the external devices take precedence over all the others, then means must be provided whereby the external device may interrupt the normal computer operation and assume priority over all of the other external devices whereby the computer establishes communication with the device producing the highest order interrupt.

This priority selection in prior art systems is accomplished through tabling the interrupt information in a buffer section of memory at the time they occur. However, the computer may have to complete a current task before the highest priority interrupt stored in the buffer section can be processed. During this waiting interval, several other interrupts of various priorities may have been stored in the buffer section of memory. Since these interrupts are stored sequentially in the order in which they occur, it is possible to store a very high priority interrupt, a low priority and succeeding higher priority interrupts. Since the interrupts stored in the buffer section in memory are processed sequentially, i.e. in the order in which they are stored, it is possible that a low priority interrupt may be processed ahead of a high priority interrupt.

The present invention overcomes the disadvantage of the prior art systems by enabling only interrupts of a particular priority level to be stored in a particular table. This is accomplished by providing a plurality of tables for storing interrupts, each table sequentially storing interrupts of the same level. Thus, all interrupts in a particular table are processed ahead of interrupts in lower priority tables even though a lower priority interrupt was stored ahead of the higher priority interrupts.

Thus, it is an object of the present invention to provide priority tabling of interrupts.

It is another object to the present invention to process a higher order interrupt ahead of a stored lower order interrupt even though the lower order interrupt was received and stored ahead of the higher order interrupt.

It is still another object of the present invention to provide a plurality of interrupt tables each of which sequentially stores received interrupts of the same priority only.

It is a further object of the present invention to process all interrupts of one priority stored in a particular table prior to processing any interrupts stored in a table of lower priority even though said lower priority interrupts were received and stored prior to any or all of the higher priority interrupts.

BRIEF DESCRIPTION OF THE DRAWINGS

Other objects and attendant advantages of the present invention will be readily appreciated through reference to the following description and claims and to the accompanying drawings which disclose, by way of example, the principles of the present invention and the best mode contemplated of applying these principles and wherein like numerals indicate like objects and wherein:

DETAILED DESCRIPTION OF THE DRAWINGS

Figure 1:
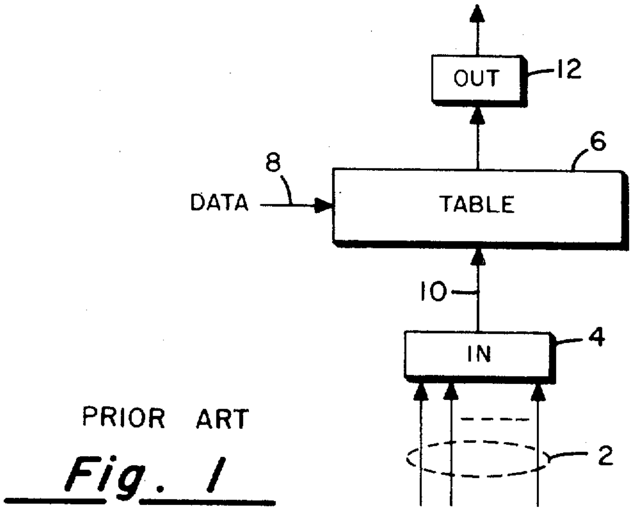
PRIOR ART Fig. 1
FIG. 1. discloses the prior art system of tabling interrupts.

FIG. 1 discloses the prior art circuitry for tabling interrupts on a priority basis. A plurality of various priority input signals are present on line 2 as inputs to input circuit 4 which can be a well-known priority circuit such as that shown in FIG. 3 of U.S. Pat. No. 3,283,306. Input circuit 4 selects the highest priority interrupt signal present on input lines 2 and couples it to MEMORY 6. The selected interrupt signal causes a COUNTER (not shown) to select an address in MEMORY 6 at which the Data on line 8 associated with the selected interrupt on line 10 is to be stored. The COUNTER is then incremented by one count in the manner shown in FIG. 3 in order to select the MEMORY 6 address at which the next priority interrupt (that is to be selected and received on line 10) will be stored. This means that if the next interrupt available on one of lines 2 is of a higher priority or more important than the previously stored interrupt, it must be stored in succession in MEMORY 6 at an address determined by the COUNTER and cannot be processed until the previously stored interrupt has been processed. This is true because output circuit 12 also has a COUNTER associated with it and selects stored interrupts for processing in the same order in which they were stored. The COUNTER (not shown) associated with output circuit 12 is then decremented by one count in order to select the next priority interrupt that is to be processed.

Figure 2:
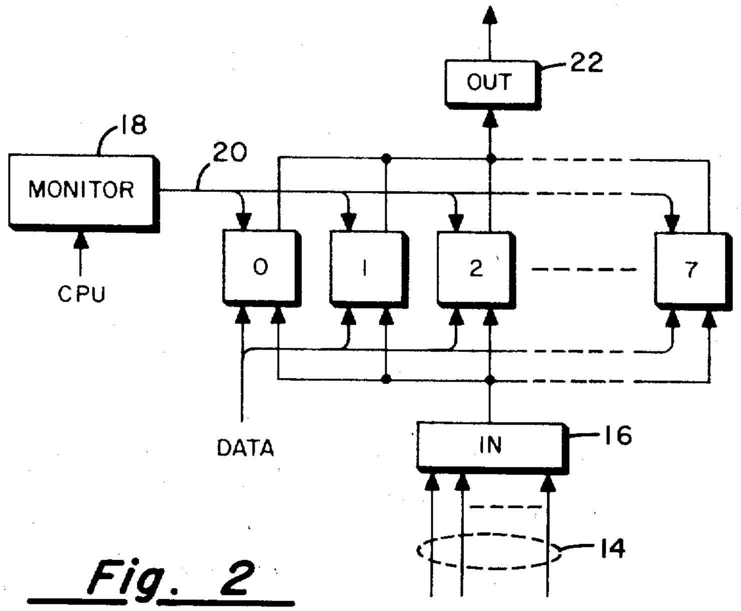
FIG. 2. discloses the basic block diagram of the circuiting of the present invention for tabling interrupts on a priority basis.

FIG. 2 discloses the basic block diagram of the present invention which overcomes the disadvantages of the prior art circuits by enabling only priorities of a particular level to be stored in a particular queue or buffer.

In the Circuit of FIG. 2 a plurality of storage areas in the Memory are used to store the Interrupts on a priority basis. Thus, Tables 0—7 are used. Table 0, for instance, may have the highest priority while Table 7 may have the lowest priority. Any individual Table is used in the manner of the prior art, i.e. data is stored in sequence and must be retrieved in the same sequence. However, associated with each of the Tables 0—7 is a WRITE COUNTER, shown in detail in FIG. 3, which enables the Tables to be selected on a priority basis when data is to be stored in the Tables and a READOUT COUNTER, also shown in detail in FIG. 3, which enables data to be read out of a Table that has been selected on a priority basis.

Thus, whenever an EXTERNAL INTERRUPT REQUEST or an INTERNAL INTERRUPT REQUEST is present on one of the lines of input cable 14, PRIORITY network 16 examines all of the input lines and selects the one having the highest priority. Such a network is old and well known in the art and will not be described in detail here although it may be of the type disclosed in FIG. 3 of U.S. Pat. No. 3,283,306. It then produces an output signal which causes the address stored in the WRITE counter of that priority to be transferred to an ADDRESS REGISTER where it selects an address within the Table of the proper priority and causes the Interrupt data on the data line or in the Buffer Control Word (BCW) to be stored at the proper address within that Table.

In like manner, data is read out of the highest priority Table in the sequence in which it was stored. Thus, when the Central Processing Unit (CPU) is available to receive an interruption, it sends a signal to monitor circuit 18 which scans each of the Tables via cable 20 and selects the highest priority Table. Output circuit 22 then causes data to be read out of the highest order level of the selected Table.

Figure 3:
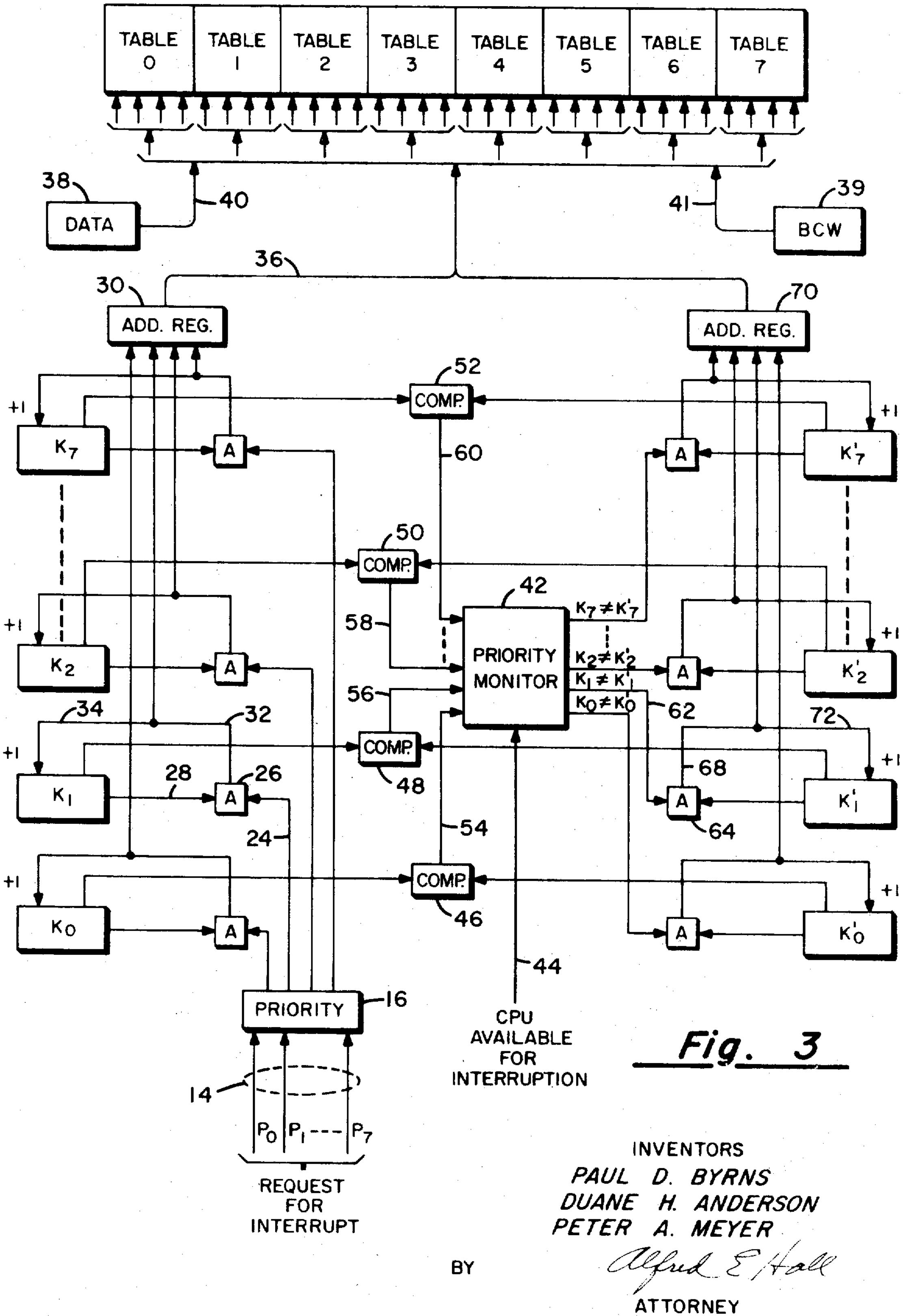
FIG. 3. is a detailed block diagram of the present invention.

Consider now the operation of the detailed circuit shown in FIG. 3.

Assume, for example, that the highest priority Interrupt on cable 14 is an External Interrupt which requires the Interrupt data to be stored in Table 1. Priority network 16 will produce an output on line 24 which is coupled to AND gate 26 as one input. The other input is the address stored in Counter $K_1$ on line 28. The signal from PRIORITY network 16 on line 24 is an enabling signal which causes AND gate 26 to pass the address in Counter $K_1$ to ADDRESS REGISTER 30 via cable 32. Further, the data on cable 32 is coupled back to Counter $K_1$ via line 34 to increment the Counter by one count and thus ready it for the next Interrupt of the same priority which will be stored in the same Table but the next succeeding location. The address stored in the ADDRESS REGISTER 30 is gated to Table 1 via cable 36 where it specifies the address at which the data associated with the Interrupt and stored in DATA REGISTER 38 is to be located. The data signals are coupled to Table 1 via cable 40. If the Interrupt signal is an Internal Interrupt, the data stored in Buffer Control Word register 39 is coupled to the appropriate Table via line 41. However, circuit operation is the same otherwise.

Thus, it is seen that as each Interrupt Request is received, it is examined for priority and a signal is produced that causes the address stored in the proper priority Counter to gate the data associated with the Interrupt to the proper Table and the proper location therein.

Readout of the Interrupt data stored in the Tables is accomplished in a similar manner. Thus, when the CENTRAL PROCESSING UNIT is available to receive an interruption, it sends a signal to Monitor Circuit 42 via line 44 which causes the circuitry to scan each of the Tables and to read out the data of the next succeeding location in the highest priority Table. Any Tables that are empty or do not store an Interrupt are not considered.

Assume that the data associated with the highest priority Interrupt is stored in Table 1. Assume also that the CENTRAL PROCESSING UNIT is available to receive in interruption and has, therefore, placed a signal on line 44 to PRIORITY MONITORING CIRCUIT 42. This circuit is another priority circuit that is well known in the prior art and which utilizes the CPU available signal in a well known manner to gate out the highest priority signal as shown in FIG. 3 U.S. Pat. No. 3,283,306.

CIRCUIT 42 also receives input from COMPARATORS 46, 48, 50 and 52 on lines 54, 56, 58 and 60 respectively. The function of these COMPARATORS is to determine the highest priority Table having data stored therein and there is one COMPARATOR for each Table although only four Comparators are shown in FIG. 4 for simplicity of the drawings. Thus, if no data is stored in Table 0, the address stored in Write Counter $K_0$ will be the same address stored in READOUT Counter $K'_0$ and COMPARATOR 46 will produce an output on line 54. Continuing with our present example, with data stored in Table 1 (and no data stored in Table 0) and in Tables 2—7, MONITORING CIRCUIT 42 ignores the signal from COMPARATOR 46 on line 54 since it indicates that no data is stored in Table 0. However, with data stored in the rest of the Tables 1—7, it will recognize that the highest priority Table storing data is Table 1 and will, therefore, produce a signal on line 62 which indicates that the address stored in Counter $K_1$ is not equal to the address stored in Counter $K'_1$ and, therefore, data must be stored in Table 1, the highest priority Table. The signal on line 62 is coupled as an enabling signal to AND gate 64. The other input to AND gate 64 is the address stored in Counter $K'_1$ and present on cable 66. This address passes through AND gate 64 on cable 68 and is coupled to ADDRESS REGISTER 70. REGISTER 70 is readout register and thus causes the data stored in Table 1 at the address indicated to be readout. Also the output of AND gate 64 on line 68 is coupled back to Counter $K'_1$ via line 72 to increment it by one count and, thus, ready it to readout the data in the next succeeding location in Table 1 when the CPU is ready to process the next of that priority. Obviously, the remaining counters and circuitry operate in a similar manner.

Thus, it will be seen that a novel Interrupt Tabling Circuit has been disclosed which utilizes hardware to cause Interrupt signals to be tabled on a priority basis and then be read out also on a priority basis. This system enables a plurality of Interrupts to be received and processed in some order other than that in which they were received.

We claim:

1. A method of tabling and processing data associated with interrupt signals on a priority basis which comprises the steps of:

a. receiving a plurality of interrupt signals having different levels of priority,
b. selecting the interrupt signal having the highest priority, and
c. storing data associated with the selected level of interrupt priority in a storage table having a corresponding priority level as designated by said selected interrupt signal.

2. The method of claim 1 including the further steps of:

a. individually storing the address of the latest data stored in each of said tables,
b. individually storing the address where the latest data is to be retrieved from each of said tables,
c. comparing corresponding ones of said addresses of the latest stored data and the latest data to be retrieved for corresponding tables to indicate each table that has data stored therein,
d. receiving a readout signal, and
e. gating the latest stored data out of the highest priority table having data stored therein upon receiving said readout signal.

3. A circuit for tabling and processing data associated with interrupt signals comprising:

a. an input priority circuit for receiving a plurality of input signals having different levels of priority and selecting the one of said input signals having the highest priority,
b. a like plurality of storage tables, each of said tables storing data associated only with a particular priority level,
c. a plurality of input counters equal in number to said storage tables and representing corresponding levels of interrupt priority, each of said counters being associated with a corresponding one of said tables and containing an address of a storage location therein,
d. gate means coupled to said counters, said priority circuit and said tables for gating out the address in the counter associated with the selected priority interrupt which enables data associated with said interrupt to be stored at the proper address in the table having a corresponding priority,
e. a plurality of output counters equal in number to said 1 input counters, each of said output counters being associated with a corresponding one of said tables and storing the address in a corresponding table where the latest data is to be retrieved,
f. a like plurality of comparators for producing signals representing whether data is stored in each table by comparing the address of corresponding input and output counters, and g. an output priority circuit coupled to said comparators and said counters for selecting the highest order priority signal from said comparators and causing the address stored in a corresponding output counter to enable data stored at that address in the table with corresponding priority to be read out.

UNITED STATES PATENT OFFICE

CERTIFICATE OF CORRECTION

Patent No. 3599162 Dated August 10, 1971

Inventor(s) Paul D. Byrns, Duane H. Anderson, Peter A. Meyer

It is certified that error appears in the above-identified patent and that said Letters Patent are hereby corrected as shown below:

Column 1, Line 41 - After "low" and before "devices" delete "speeds" and insert -- speed --.

Column 3, Line 54 - After "receive" and before "interruption", delete "in" and insert -- an --.

Column 4, Line 67 - After "said", delete "1".

Signed and sealed this 9th day of May 1972.

(SEAL)
Attest:

EDWARD M.FLETCHER,JR.
Attesting Officer

ROBERT GOTTSCHALK
Commissioner of Patents